(12) United States Patent
Robert et al.

(10) Patent No.: US 11,629,757 B2
(45) Date of Patent: Apr. 18, 2023

(54) METHOD FOR MANUFACTURING A SENSOR BEARING UNIT

(71) Applicant: Aktiebolaget SKF, Gothenburg (SE)

(72) Inventors: Eric Robert, Saint Cyr sur Loire (FR); Benedicte Thomas, Ballan-Mire (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/842,906

(22) Filed: Jun. 17, 2022

(65) Prior Publication Data

US 2022/0316530 A1 Oct. 6, 2022

Related U.S. Application Data

(63) Continuation of application No. 17/228,899, filed on Apr. 13, 2021, now Pat. No. 11,378,131.

(30) Foreign Application Priority Data

May 25, 2020 (DE) .......................... 102020206479.2

(51) Int. Cl.
*F16C 43/04* (2006.01)
*F16C 41/00* (2006.01)
*B23P 15/00* (2006.01)

(52) U.S. Cl.
CPC ............ *F16C 43/04* (2013.01); *B23P 15/003* (2013.01); *F16C 41/007* (2013.01); *Y10T 29/49679* (2015.01)

(58) Field of Classification Search
CPC ................ Y10T 29/49679; B23P 15/26; F16C 41/007; F16C 2326/02
See application file for complete search history.

(56) References Cited

U.S. PATENT DOCUMENTS

| | | | | |
|---|---|---|---|---|
| 4,898,480 A * | 2/1990 | Raj | ........................... | F16J 15/43 384/488 |
| 4,998,034 A * | 3/1991 | Hashimoto | ............ | H02K 15/03 310/156.64 |
| 5,038,471 A * | 8/1991 | Peilloud | .................. | G01P 3/443 384/448 |
| 6,329,814 B1 * | 12/2001 | Ichiman | .................. | G01P 3/487 324/207.25 |
| 6,700,367 B1 * | 3/2004 | Santos | ..................... | G01P 3/443 324/207.25 |
| 6,750,647 B2 * | 6/2004 | Morimura | ............. | H01F 13/003 361/143 |
| 7,019,515 B2 * | 3/2006 | Sentoku | ............... | G01D 5/2451 324/207.25 |

(Continued)

FOREIGN PATENT DOCUMENTS

EP 1262780 A2 * 12/2002 .............. G01P 3/487

*Primary Examiner* — Jason L Vaughan
(74) *Attorney, Agent, or Firm* — Garcia-Zamor Intellectual Property Law, LLC; Ruy Garcia-Zamor

(57) ABSTRACT

The method provides for the manufacturing a sensor bearing unit including a bearing having a first ring and a second ring capable of rotating concentrically relative to one another, and an impulse ring provided with a target holder secured to the first ring and with a magnetic target mounted on the target holder. The method further includes securing the target holder to the first ring and magnetizing the magnetic material of the magnetic target after the step of securing the target holder to the first ring.

18 Claims, 3 Drawing Sheets

(56) References Cited

U.S. PATENT DOCUMENTS

| | | | | |
|---|---|---|---|---|
| 7,237,960 B2* | 7/2007 | Oohira | ............... | G01P 3/443 |
| | | | | 29/445 |
| 7,304,471 B2* | 12/2007 | Koike | ............... | F16C 41/007 |
| | | | | 324/207.25 |
| 7,508,193 B2* | 3/2009 | Yarimizu | ............ | G01D 5/2457 |
| | | | | 310/68 B |
| 8,436,705 B2* | 5/2013 | Takahashi | ........... | G01D 5/2451 |
| | | | | 335/301 |
| 9,607,747 B2* | 3/2017 | Tomioka | ............. | H01F 13/003 |
| 9,976,874 B2* | 5/2018 | Takahashi | ............... | G01D 5/14 |
| 10,529,477 B2* | 1/2020 | Takahashi | ............ | H01F 13/003 |
| 11,099,037 B2* | 8/2021 | Koike | .................. | G01D 5/14 |
| 2001/0030533 A1* | 10/2001 | Iwamoto | ............. | F16C 41/007 |
| | | | | 324/174 |
| 2005/0218884 A1* | 10/2005 | Koike | ................ | F16C 41/007 |
| | | | | 324/174 |
| 2006/0001514 A1* | 1/2006 | Seno | ..................... | G01P 3/443 |
| | | | | 335/284 |
| 2010/0225309 A1* | 9/2010 | Takahashi | ............. | G01P 3/443 |
| | | | | 324/207.25 |
| 2011/0158570 A1* | 6/2011 | Takahashi | ........... | G01D 5/2451 |
| | | | | 384/446 |
| 2012/0105055 A1* | 5/2012 | Takahashi | ........... | F16C 41/008 |
| | | | | 324/207.25 |
| 2019/0346292 A1* | 11/2019 | Koike | ................... | G01D 5/14 |
| 2021/0072014 A1 | 3/2021 | Liverato et al. | | |

\* cited by examiner

METHOD FOR MANUFACTURING A SENSOR BEARING UNIT

CROSS-REFERENCE TO RELATED APPLICATIONS

This continuation application claims the benefit of priority to U.S. application Ser. No. 17/228,899, filed Apr. 13, 2021, which claims priority to German Patent Application no. 102020206479.2, filed May 25, 2020, the contents of which are both fully incorporated herein by reference.

TECHNICAL FIELD

The present invention relates to a method for manufacturing a sensor bearing unit. More precisely, the present invention relates to a method for manufacturing a sensor bearing unit comprising a bearing and an impulse magnetic ring.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder fixed to the inner ring of the bearing, and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

The magnetic target is attached to an outer tubular portion of the target holder. The target holder is also provided with an inner tubular portion secured into a groove made in the bore of the inner ring.

Classically, this groove of the inner ring is soft turned, and then a heat treatment is applied on the inner ring. Then, the magnetic poles of the target ring are created by magnetization. After that, the target holder provided with the target ring is secured into the groove of the inner ring.

With this sequence of operations, the groove presents a large concentricity defect with the inner ring bore diameter. This defect causes a degradation of the total pitch deviation of the magnetic target during assembly of the impulse ring with the inner ring.

The total pitch deviation, named TPD, is a parameter used to characterized the magnetic ring. It evaluates the cumulative error on the position of the magnetic ring by measuring the single pitch deviation for each ring pole.

Determination of the TPD for a magnetic ring with magnetic poles is similar to the determination of the TPD for gears or mechanical encoders as seen in ABS applications.

An interval is defined as the angular distance between two nearest poles of same polarity. A general method to calculate TPD is described by the following equations:

Single pitch deviation error SPD for interval i can be calculated on the basis of the formula:

$$SPD(i) = \frac{P_{Theoretical} - P_{real}(i)}{P_{Theoretical}} \times 100$$

wherein:

$P_{Theoretical}$: Theoretical period of the angular signal for an interval $P_{real}(i)$: Actual period of the angular signal for interval i.

It is to be noted that the actual period $P_{real}(i)$ is to be determined between poles of same sign, i.e. between North poles or between South poles. Similarly, the actual period $P_{real}(i)$ is to be determined between the same kind of signal edges, i.e. between rising edges or between falling edges.

Total or cumulative pitch deviation error TPD(i) for interval i can be calculated on the basis of the formula:

$$TPD(i) = \sum_{n=1}^{n=i} SPD(n)$$

Total pitch deviation error TPD on a mechanical turn can be calculated on the basis of the formula:

$$TPD = \max\left(\sum_{i=1}^{i=Nbpp} SPD(i)\right) - \min\left(\sum_{i=1}^{i=Nbpp} SPD(i)\right)$$

wherein Nbpp: Number of intervals in a mechanical turn.

One aim of the present invention is to overcome the above-mentioned drawback.

SUMMARY OF THE INVENTION

The invention relates to a method for manufacturing a sensor bearing unit comprising a bearing comprising a first ring and a second ring capable of rotating concentrically relative to one another, and an impulse ring provided with a target holder secured to the first ring and with a magnetic target mounted on the target holder.

The method comprises the following steps:
a) securing the target holder to the first ring, and
b) magnetizing the magnetic material of the magnetic target after the step of securing the target holder to the first ring.

Such a manufacturing method limits the degradation of the total pitch deviation value of the magnetic target installed onto the associated ring. The measurement accuracy of the sensor bearing unit is improved.

According to further aspect, at step b) the magnetic material of the magnetic target is magnetized in order to create North and South alternated poles.

Preferably, at step a) the target holder is secured inside a groove made in a cylindrical surface of the first ring.

At step b) a magnetization yoke may be centered directly on the cylindrical surface of the first ring having the groove.

In one embodiment, at step a) the target holder is secured inside the groove which is formed in the bore of the first ring.

In another embodiment, at step a) the target holder is secured inside the groove which is formed in the outer cylindrical surface of the first ring.

The method may further comprise, before step a), the step of machining the groove in the cylindrical surface of the first ring.

According to further aspect, the method may further comprise assembling the components of the bearing before step b). This assembly step may be done after step a) or before step a).

Alternatively, the components of the bearing may be assembled after step b).

The invention relates to a method for manufacturing a sensor ring for a sensor bearing unit, the sensor ring comprising a ring and an impulse ring provided with a target holder secured to the ring and with a magnetic target mounted on the target holder.

The method comprises the following steps:
a) securing the target holder to the ring, and
b) magnetizing the magnetic material of the magnetic target after the step of securing the target holder to the ring.

BRIEF DESCRIPTION OF THE DRAWINGS

The present invention and its advantages will be better understood by studying the detailed description of specific embodiments given by way of a non-limiting examples and illustrated by the appended drawings on which.

DETAILED DESCRIPTION OF THE INVENTION

Figure 1:
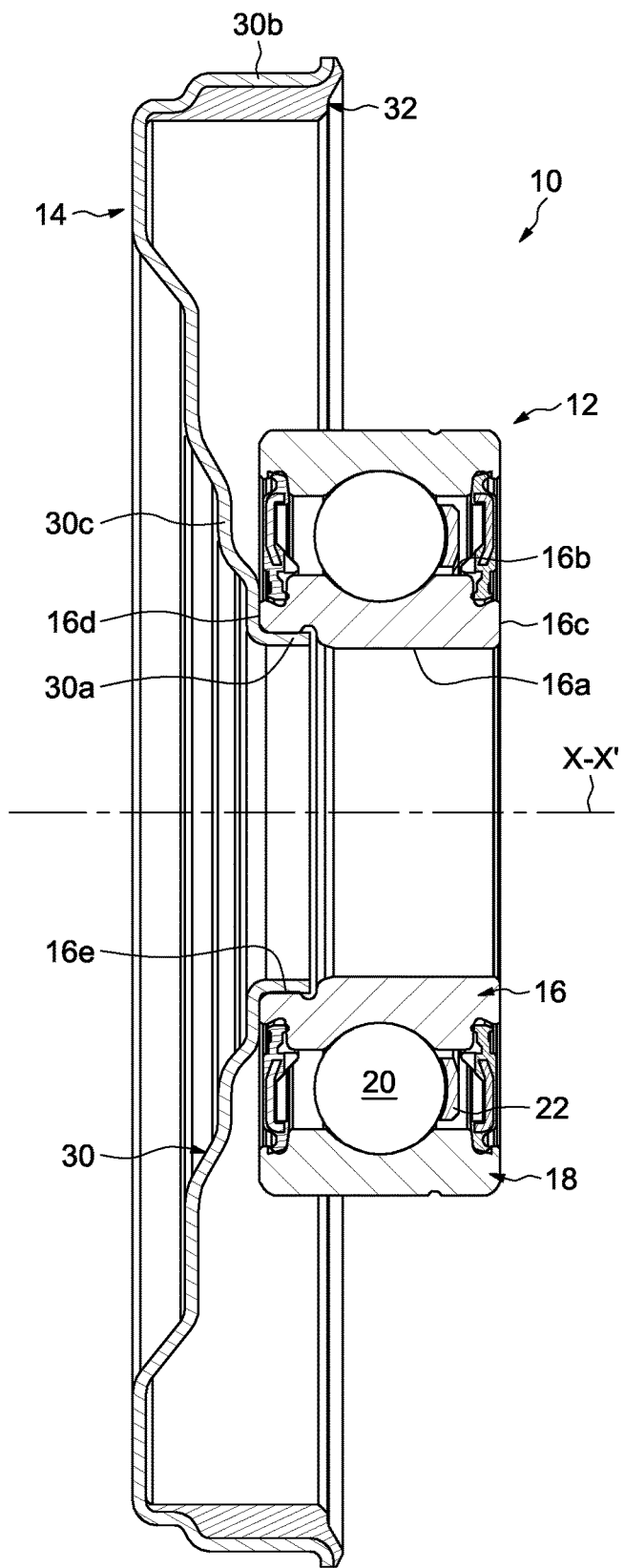
FIG. 1 is an axial section view of a sensor bearing unit according to an example of the invention.

The sensor bearing unit 10 represented on FIG. 1 is adapted to equip an apparatus such a motor, a brake system, a suspension system or any rotating machine, in particular for an automotive vehicle.

The sensor bearing unit 10 comprises a bearing 12 and an impulse ring 14 mounted on the bearing.

The bearing 12 comprises comprising a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is intended to be mounted on a shaft of the apparatus for tracking the rotation of the shaft. The inner ring 16 is intended to rotate while the outer ring 18 is intended to be fixed. The outer ring 18 can be mounted in a fixed support member or housing, belonging to the apparatus.

The inner ring 16 comprises a cylindrical inner surface or bore 16a and an outer cylindrical surface 16b which is radially opposite to the bore 16a and from which a toroidal circular raceway for the rolling elements 20 is formed, said raceway being directed radially outwards. The inner ring 16 further comprises two opposite radial lateral faces 16c, 16d which axially delimit the bore 16a and the outer surface 16b of said ring.

The inner ring 16 also comprises a cylindrical groove 16e made in the bore 16a. The groove 16e is centered on the axis X-X'. Diameter of bore 16a is smaller than diameter of groove 16e. The groove 16e opens on the radial lateral face 16d.

The impulse ring 14 is mounted on the inner ring 16. The impulse ring 14 comprises an annular target holder 30 mounted on the inner ring 16, and a magnetic target 32 mounted on said target holder.

The target holder 30 is secured into the annular groove 16e of the inner ring. The target holder 30 comprises an inner annular axial portion 30a mounted into the groove 16e, an outer annular axial portion 30b radially surrounding the inner axial portion 30a and the bearing 12, and an annular radial portion 30c extending between said inner and outer axial portions.

The inner axial portion 30a of the target holder is secured into the groove 16e of the inner ring to fasten in rotation the impulse ring 14 with the rotatable inner ring 16. For example, the inner axial portion 30a of the target holder may secured into the groove 16e, by press-fitting, by snapping, by gluing, by welding or any other appropriate means.

In the disclosed example, the radial portion 30c of the target holder axially comes into contact against the radial lateral face 16d of the inner ring. The outer axial portion 30b of the target holder is located radially above the outer ring 18 of the bearing.

In the disclosed example, the target holder 30 is made in one part. The target holder 30 may be made of metal or plastic, formed by stamping or by any other suitable process.

The magnetic target 32 is mounted on the outer axial portion 30b of the target holder. In the disclosed example, the magnetic target 32 is mounted into the bore of the outer axial portion 30b. Alternatively, the magnetic target 32 may be mounted on the outer surface of the outer axial portion 30b.

The magnetic target 32 includes magnetic North and South alternated poles. The magnetic target 32 is multipolarly magnetized in the circumferentially direction. The magnetic target 32 may be a plastic molded part. The magnetic target 32 may be overmolded onto the target holder 30. Alternatively, the magnetic target 32 may be separately formed and secured onto the target holder 30 by any appropriate means, for example by bonding or by press-fitting. The magnetic target 32 may be formed of a rubber material with magnetic powder, or of a magnetic alloy or of a plasto-ferrite or of an elasto-ferrite.

Detection means (not shown) are associated with the target 32 for tracking the rotation of the impulse ring 14 and the inner ring 16 around the axis X-X'. The detection means are disposed to radially face the inner surface of the magnetic target 32. For example, the detection means may include Hall-effect sensors.

Figure 2:
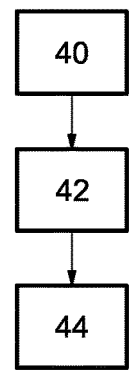
FIG. 2 shows the main steps of a method for manufacturing the sensor bearing unit of FIG. 1 according to a first example of the invention.

FIG. 2 shows the main steps of a method for manufacturing the sensor bearing unit 10 according to an example of the invention.

According to this example, the manufacturing method provides an assembly step 40 of the components of the bearing 12, namely the inner and outer rings 16, 18, the rolling elements 20 and the cage 22. The groove 16e of the inner ring may be machined, for example by turning, after or before the assembly step 40.

After the assembly step 40, the target holder 30 provided with the target ring 32 is mounted on the inner ring 16 during a step 42. During this mounting step 42 of the target holder, the inner axial portion 30a of the target holder is introduced into the groove 16e of the inner ring. Optionally, the target holder 30 may be turned in the circumferential direction inside the groove 16e of the inner ring to a specific angular position. Then, the target holder 30 is secured inside the groove 16e of the inner ring.

Otherwise, in this example, the target ring 32 is mounted on the target holder 30 before the mounting step 42 of the target holder on the inner ring. Alternatively, the target ring 32 may be mounted on the target holder 30 after the mounting step 42.

In this example, the manufacturing method begins with the assembly step 40 of the components of the bearing 12. Alternatively, the manufacturing method may begin with the mounting step 42 of the target holder 30 on the inner ring 16, for example if the bearing 12 is assembled on a different production site that is remote from the site where the target holder 30 is mounted on the inner ring 16.

Then, a magnetization step 44 is achieved on the target ring 32. The magnetization step 44 is achieved to create North and South alternated poles. During this step 44, a magnetization yoke is used and may be centered directly on the inner ring bore 16.

The magnetization yoke may have a pair of tooth profiles having an exciting coil wound thereon. In a first sub-step, the tooth profiles are closely radially arranged on the bore of the target ring 32. In this state, a current is fed to the exciting coil for generating a magnetic flux in the radial direction so that said magnetic flux passes through the target ring 32 for obtaining a pair of North and South poles. Thereafter, a second sub-step of rotating the target ring 32 together with the target holder 30 by a prescribed angle and magnetizing the same is repeated thereby multi-polarly magnetizing the overall bore of the target ring 32 in the circumferential direction. The North and South alternated poles exhibit substantially identical magnetization strength.

With the manufacturing method of the invention having the magnetization step of the magnetic target 32 done after installation of the target holder 30 on the inner ring 16, the degradation of the total pitch deviation of the target ring 32 is limited.

Figure 3:
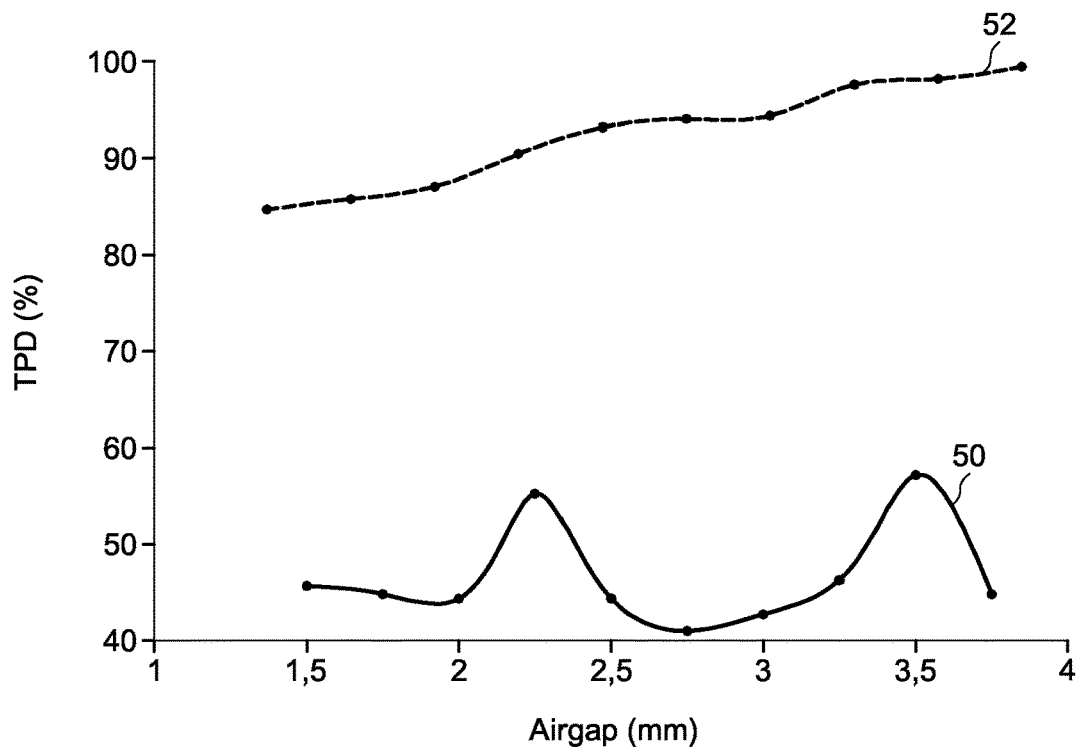
FIGS. 3 and 4 are curves showing the evolution of the total pitch deviation of a magnetic impulse ring for the sensor bearing unit of FIG. 1 and for a conventional sensor bearing unit.

On FIG. 3, the curve 50 shows the evolution of the total pitch deviation of the magnetic target 32 (FIG. 1) of the impulse ring for the sensor bearing unit manufactured according to the invention, the total pitch deviation being measured at various radial airgaps between the Hall effect cell and the magnetic target 32.

The curve 52 shows the evolution of the total pitch deviation of the magnetic target of an impulse ring of a conventional sensor bearing unit having the magnetization step of the magnetic target done before installation of the target holder on the inner ring, the total pitch deviation being also measured at various radial airgaps between the Hall effect cell and the magnetic target.

As shown on FIG. 3, for the sensor bearing unit manufactured according to the invention, the values of the total pitch deviation are limited.

Figure 4:
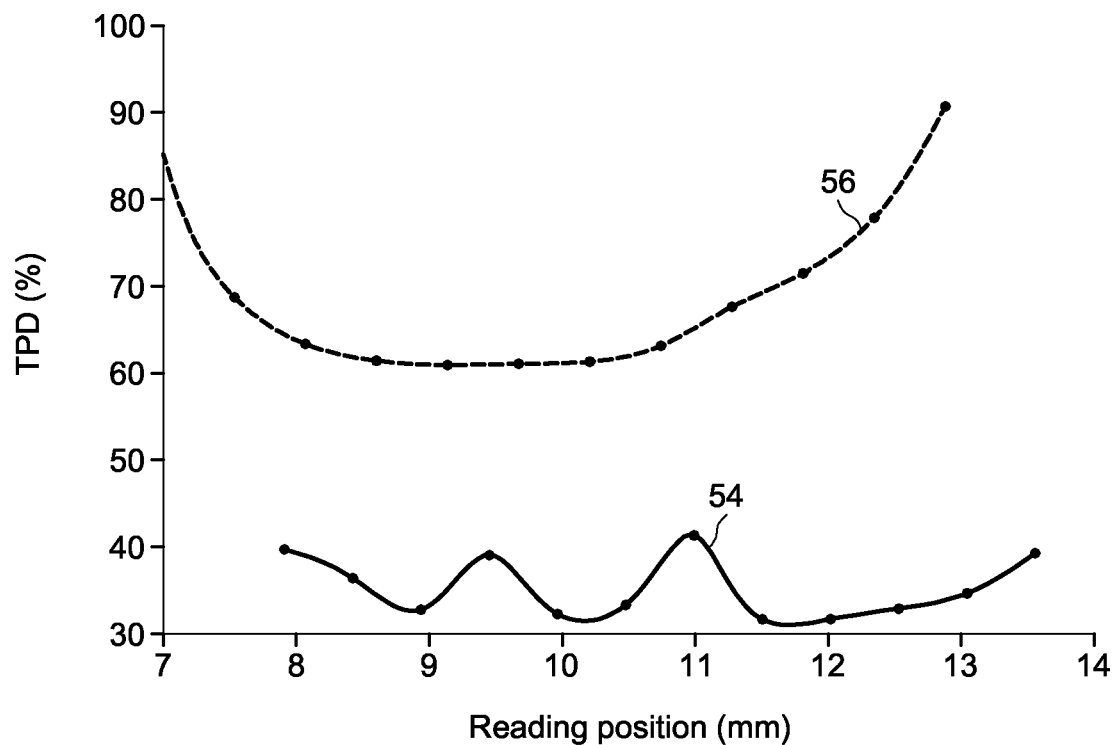

On FIG. 4, the curves 54, 56 also respectively show the evolution of the total pitch deviation of the magnetic target of the impulse ring for the sensor bearing unit manufactured according to the invention, and for a conventional sensor bearing unit. Here, the total pitch deviation is measured at various axial reading positions between the Hall effect cell and the magnetic target.

As shown on FIG. 4, the total pitch deviation of the impulse ring for the sensor bearing unit manufactured according to the invention is always smaller than for a conventional sensor bearing unit no matter the axial position is.

Figure 5:
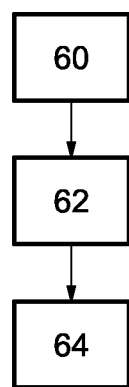
FIG. 5 shows the main steps of a method for manufacturing the sensor bearing unit of FIG. 1 according to a second example of the invention.

FIG. 5 shows the main steps of a method for manufacturing the sensor bearing unit according to another example of the invention.

In this example, the manufacturing method provides a mounting step 60 of the target holder 30 on the inner ring 16 which is a stand-alone ring. The inner axial portion 30a of the target holder is introduced into the groove 16e of the inner ring. Optionally, the target holder 30 may be turned in the circumferential direction inside the groove 16e of the inner ring to a specific angular position. Then, the target holder 30 is secured inside the groove 16e of the inner ring.

Preferably, the target holder 30 mounted on the inner ring 16 is equipped with the target ring 32. Alternatively, the target ring 32 may be mounted on the target holder 30 after the mounting step 60.

Then, the manufacturing method provides a magnetization step 62. The magnetization step 62 is performed as previously described in the first example.

The manufacturing method further comprises an assembly step 64 of the components of the bearing 12, namely the inner and outer rings 16, 18, the rolling elements 20 and the cage 22.

In this example, the manufacturing method ends with the assembly step 64 of the components of the bearing 12. Alternatively, the magnetization step 62 and the assembly step 64 may be inverted.

In the illustrated examples, the sensor bearing unit is provided with a rolling bearing comprising one row of rolling elements.

Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Otherwise, as previously mentioned, in these illustrated examples, the first ring of the rolling bearing is the inner ring 16 whereas the second ring is the outer ring 18. As an alternative, it could be possible to provide a reversed arrangement with the first ring forming the outer ring and the second ring forming the inner ring. In this case, the target holder is secured to the outer ring.

In the illustrated examples, the method relates to the manufacturing of the sensor bearing unit.

The invention also relates to a method for manufacturing a sensor ring for the sensor bearing unit, the sensor ring being the inner or outer ring equipped with the impulse ring. If the sensor ring is the inner ring, the manufacturing method differs from the one as previously described in the second example only in the fact said method does not comprise the assembly step 64 of the components of the bearing. As a matter of fact, in this case, the bearing with the sensor ring is assembled on a different production site that is remote from the site where the target holder 30 is secured to the inner ring and where the target ring 32 is then magnetized.

The invention claimed is:
1. A method for manufacturing a sensor bearing unit comprising:
   providing components of a bearing comprising a first ring and a second ring capable of rotating concentrically relative to one another, and an impulse ring comprising a target holder for mounting on the first ring and a magnetic target made of a magnetic material, wherein the method comprises the following steps, performed in order:
a) securing the target holder to the first ring,
b) turning the target holder in a circumferential direction to a specific angular position,
c) mounting the magnetic target onto the target holder,
d) magnetizing the magnetic material of the magnetic target after the step of mounting the magnetic target onto the target holder, and
e) assembling the bearing by securing the first ring to the second ring.

2. The method of claim 1, wherein at step b) the magnetic material of the magnetic target is magnetized in order to create North and South alternating poles, wherein the magnetic target is a single piece that is not formed of multiple components.

3. The method of claim 1, wherein at step a) the target holder is secured inside a groove made in a cylindrical surface of the first ring such that the target holder is in direct contact with the first ring.

4. The method of claim 3, wherein at step a) the target holder is secured inside the groove which is formed in a bore of the first ring.

5. The method of claim 3, further comprising, before step a), the step of machining the groove in a cylindrical surface of the first ring, wherein the magnetic target is annular shaped without any notches cut therein.

6. The method of claim 1, wherein at step a) the target holder is secured inside a groove which is formed in an outer cylindrical surface of the first ring, the magnetic target being a single piece member that is not a collection of multiple targets which are assembled together.

7. The method of claim 1, wherein the magnetic target is a one piece solid member which is not cut into multiple parts.

8. The method of claim 1, wherein the magnetic target is annular shaped without any notches cut therein.

9. A method for manufacturing a sensor ring for a sensor bearing unit, the sensor ring being configured for assembly with a fixed outer ring to form the sensor bearing unit, the method comprising:
providing the sensor ring comprising a ring and an impulse ring, the impulse ring comprising a target holder and a magnetic target, the target holder being configured to be mounted on the ring and hold the magnetic target, the magnetic target being made of a magnetic material,
wherein the method comprises the following steps:
a) securing the target holder to the ring,
b) turning the target holder in a circumferential direction to a specific angular position,
c) mounting the magnetic target onto the target holder, and
d) magnetizing the magnetic material of the magnetic target after the step of mounting the magnetic target onto the target holder.

10. The method of claim 9, wherein at step b) the magnetic material of the magnetic target is magnetized in order to create North and South alternating poles.

11. The method of claim 9, wherein at step a) the target holder is secured inside a groove made in a cylindrical surface of the ring.

12. The method of claim 11, wherein at step a) the target holder is secured inside the groove which is formed in a bore of the ring.

13. The method of claim 11, further comprising, before step a), the step of machining the groove in a cylindrical surface of the first ring.

14. The method of claim 9, wherein at step a) the target holder is secured inside a groove which is formed in an outer cylindrical surface of the ring.

15. A method for manufacturing a sensor bearing unit comprising:
providing components of a bearing comprising a first ring and a second ring capable of rotating concentrically relative to one another, and an impulse ring comprising a target holder for mounting on the first ring and a magnetic target made of a magnetic material,
wherein the method comprises the following steps, performed in order:
a) securing the target holder within a groove formed in a cylindrical surface of the first ring,
b) magnetizing the magnetic material of the magnetic target after the step of securing the target holder to the first ring, and
c) assembling the bearing by securing the first ring to the second ring.

16. The method of claim 15, wherein after step a), the step of turning the target holder in a circumferential direction to a specific angular position.

17. The method of claim 15, wherein before step b), the step of mounting the magnetic target onto the target holder.

18. The method of claim 15, wherein at step a) the cylindrical surface of the first ring forms a bore.

* * * * *